N. S. Bean.
Picker Staff Motion.
No. 2,749. Reissued Aug. 20, 1867.
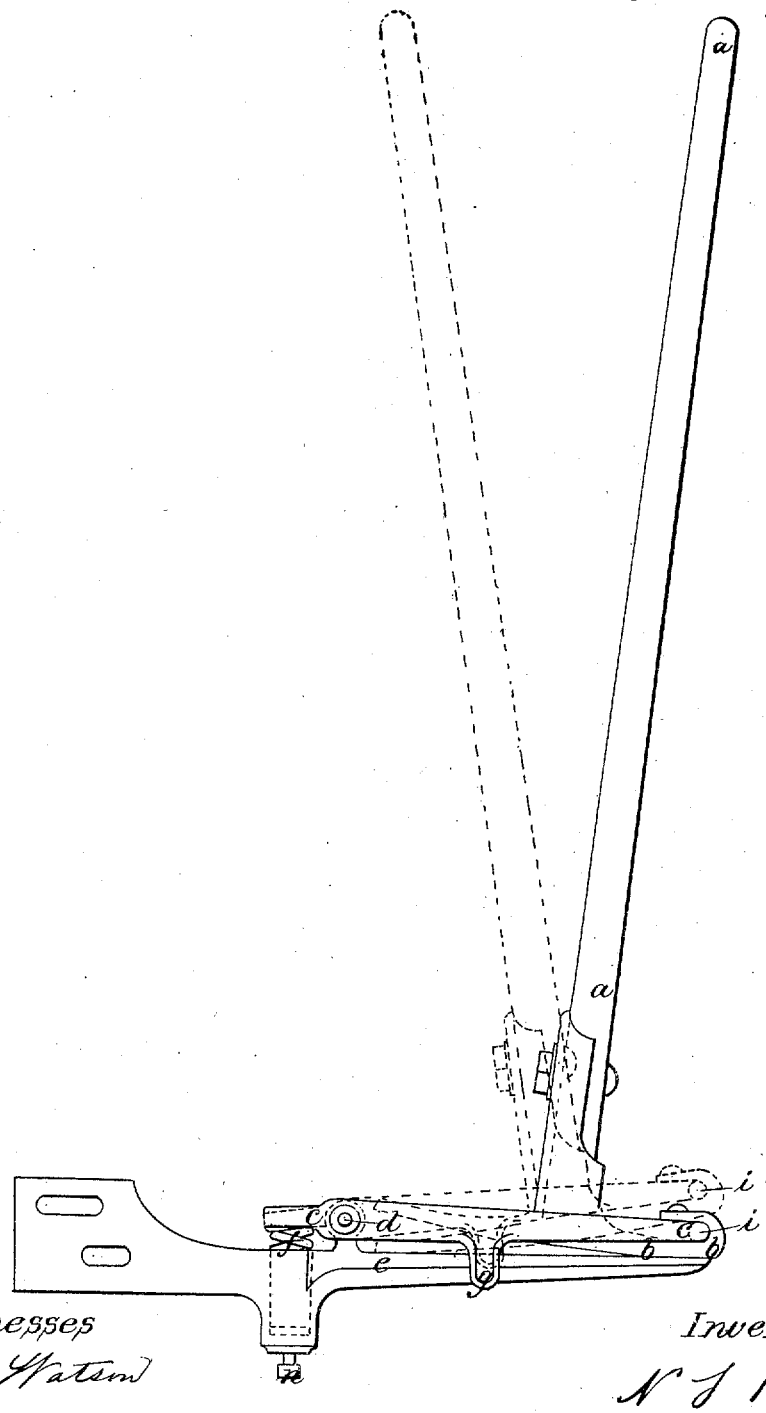
Witnesses
J. D. Watson
A. A. Balsh
Inventor
N. S. Bean
N. PETERS, PHOTO-LITHOGRAPHER, WASHINGTON, D. C.

United States Patent Office.

THE AMOSKEAG MANUFACTURING COMPANY, OF MANCHESTER, NEW HAMPSHIRE, ASSIGNEES OF NEHEMIAH S. BEAN.

*Letters Patent No.* 31,205, *dated January* 22, 1861; *reissue No.* 2,627, *dated May* 28, 1867; *reissue No.* 2,749, *dated August* 20, 1867.

IMPROVEMENT IN PICKER-STAFF MOTION FOR LOOMS.

The Schedule referred to in these Letters Patent and making part of the same.

TO ALL PERSONS TO WHOM THESE PRESENTS MAY COME:

Whereas Letters Patent numbered 31,205, and bearing date the twenty-second day of January, A. D. 1861, were granted to the "Amoskeag Manufacturing Company," of Manchester, in the State of New Hampshire, as the assignees of NEHEMIAH S. BEAN, and for an invention made by him, and styled an "Improvement in Picker-Staff Motion," the same being mechanism for supporting and guiding the picker-staff of a loom during the movements of such staff; and whereas the specification of the said invention on which such patent was granted is believed to be insufficient and defective: Now, therefore, the said "Amoskeag Manufacturing Company," through their President, do hereby declare the following to be a correct description of the said invention, reference being had to the accompanying drawing, which exhibits a side elevation of it.

In such drawing, *a* denotes the picker-staff of a loom, it being secured to a rocker, *b*, which, at *i*, is hinged to the open link *c*. This link is also hinged at *d* to a rocker-support arm or piece, *e*, which is properly formed so as to be bolted or affixed to the lay of a loom. The link has a short projection, *x*, to extend beyond the pivot *d*, by which the link is connected with the support piece *e*, the same being in order that the spring *f* may act or press upward against the short arm or projection *x* of the link, provided the link be considered as a lever. Ears *g* project from the link downward on opposite sides of and close to the support-piece *e*, and serve to guide the link during its movement, and consequently aid in guiding the picker-staff. The support-piece *e* is furnished with a pocket or recess to receive the spring *f*, there being a screw, *n*, screwed upward into and through the bottom of such pocket for the purpose of varying the pressure of the spring upon the link. The invention, in common with others, is designed to produce a movement of that part of the staff to which the picker is fixed, which shall not practically vary from the axial line of movement of the shuttle, and it consists in a peculiar arrangement and construction of parts, whereby the proper operation or movements of the picker-staff are secured. That the rocker should have such a curvature given to it as to make any given point of the picker in vibrating move in or nearly in a right line is too commonly known to herein need description. The reasons why such movement is desirable are well understood by weavers. It will be evident, on inspection of the drawing, that when the picker-staff is drawn forward in the usual well-known manner, by the combined action of a cam and strap, and for the purpose of effecting a throw or movement of the shuttle, the longer arm of the link will be elevated and its shorter arm will be depressed, the latter at the same time compressing the spring *f*. When the mechanism leaves the picker-staff free to be moved backward, the action of the spring on the shorter arm of the link will move the link, and through it the rocker, so as to cause the picker-staff to retreat to a position whereby it will be ready for another throw of the shuttle.

It is not claimed as the invention of the said BEAN, to connect the rocker to a spring arranged underneath the support-piece by means of a simple clevis extending down from one end of the rocker to one extremity of the spring, the spring at its other end being fastened to the support-piece. In the said BEAN'S invention, the link is arranged nearly horizontal, and embraces the rocker on opposite sides and lengthwise of it, whereby it serves to support the rocker along both sides of it, such arrangement of the link, rocker, and support-piece being one of much value and productive of new effects.

Having thus described the invention of the said BEAN, what is claimed, and desired to be secured by Letters Patent is as follows, viz—

The improved arrangement of the rocker *b* within the link *c*, and on the support-piece *e*.

Also the arrangement of the spring *f* with the support-piece *e*, the link *c*, and the rocker *b*.

Also the arrangement of the ears *g* with the link *c*, the support-piece *e*, and the rocker *b*, the whole being substantially as specified.

THE AMOSKEAG MANUFACTURING COMPANY,
By their President, OLIVER DEAN.

Witnesses:
JAMES M. FREEMAN,
J. A. WOODWARD.